United States Patent [19]

Piel

[11] Patent Number: 4,809,616
[45] Date of Patent: Mar. 7, 1989

[54] DEVICE FOR CONTROLLING DRIVE COUPLINGS OF THE AXLES OF A LOCOMOTIVE

[75] Inventor: Daniel Piel, Montcenis, France

[73] Assignee: Creusot-Loire, Paris, France

[21] Appl. No.: 45,226

[22] Filed: Apr. 30, 1987

Related U.S. Application Data

[63] Continuation of Ser. No. 628,380, Jul. 6, 1984, abandoned.

[30] Foreign Application Priority Data

Jul. 8, 1983 [FR] France ................................ 83 11395

[51] Int. Cl.$^4$ ............................................. B61C 15/12
[52] U.S. Cl. ........................................ 105/73; 105/75; 105/82; 177/137
[58] Field of Search ................... 105/73, 34.1, 75, 76, 105/82, 194, 209, 26.25, 96; 177/136, 137; 364/567

[56] References Cited

U.S. PATENT DOCUMENTS

| | | | |
|---|---|---|---|
| 2,590,473 | 3/1952 | Steins | 105/73 |
| 2,591,840 | 4/1952 | Lillquist | 105/73 |
| 2,813,709 | 11/1957 | Brier | 177/137 |
| 3,937,152 | 2/1976 | Nilsson et al. | 105/61 |
| 4,202,275 | 5/1980 | Bitterberg | 105/61 |
| 4,399,881 | 8/1983 | Theurer et al. | 177/137 |

FOREIGN PATENT DOCUMENTS 2639737 9/1978 Fed. Rep. of Germany ........ 105/61

Primary Examiner—Robert B. Reeves
Assistant Examiner—Donald T. Hajec
Attorney, Agent, or Firm—Rines and Rines, Shapiro and Shapiro

[57] ABSTRACT

Device for controlling drive couplings of motor bogie axles of a locomotive. The axles are individually driven by motors (4, 5) controlled by a control assembly receiving signals from sensors (6) which are constituted for measuring the vertical load of at least one motor axle and are mounted on the primary suspension of the axle.

5 Claims, 2 Drawing Sheets

DEVICE FOR CONTROLLING DRIVE COUPLINGS OF THE AXLES OF A LOCOMOTIVE

This is a continuation application of Ser. No. 628,380 filed July 6, 1984, now abandoned.

FIELD OF THE INVENTION

The present invention relates to a device for controlling the drive couplings of the power bogie axles of a locomotive so as to preserve the capacity for traction despite variations in the loads upon the axles.

BACKGROUND OF THE INVENTION

A locomotive and its bogies are subject to phenomena, called nose lift, which tend to make them pivot about their transverse axis, causing variations in the load on the axles.

The nose lift of the chassis is related to the fact that the resistant force applied to the chassis by the string of cars is located higher than the traction force transmitted by the bogie to the chassis.

The nose lift of the bogie is related to the fact that the resistant force applied to the bogie by the chassis is located higher than the traction force at the level of the rails. It is also related, in the bogies comprising motors suspended by the nose, to the fact that the motors are supported on the bogie chassis, causing unburdening of one axle and overloading of the other axle.

This nose lift movement causes certain axles to be unloaded while other axles are overloaded. There is a lessening of total traction force and an appearance of skating.

To prevent nose lift movement, solutions have been found which relate to the connections between the chassis and the bogies. One solution consists of locating the connecting points between the bogie and the chassis as close as possible to the level of the rails. This solution is called "low traction." A construction of this type consists of rods connecting the chassis to the bogies, the points of attachment to the bogies being located as low as possible.

It has been conceived to modulate the supply of the electric motors as a function of instantaneous variations in the rotational speed of the axles. The only function of this system is to prevent skating of the least loaded axles.

SUMMARY OF THE INVENTION

The object of the present invention is to provide a device for maintaining the total traction force while adjusting the drive couplings of the axles as a function of instantaneous vertical loads measured on at least one motor axle. This device operates continuously and before the appearance of the skating phenomenon.

The device according to the invention is applied to a locomotive equipped with motor bogies whose axles are individually driven by motors controlled by a control assembly receiving signals from measurement sensors, and it is essentially characterized by the fact that the latter are measurement sensors of the vertical load of at least one motor axle, and are mounted on the primary suspension of such axle.

According to one characteristic, the sensors are mounted on the plates seated above springs of the primary suspension.

BRIEF DESCRIPTION OF THE DRAWINGS

The invention will now be described in greater detail, with reference to an embodiment given by way of example and shown in the accompanying drawings.

DETAILED DESCRIPTION

Figure 1:
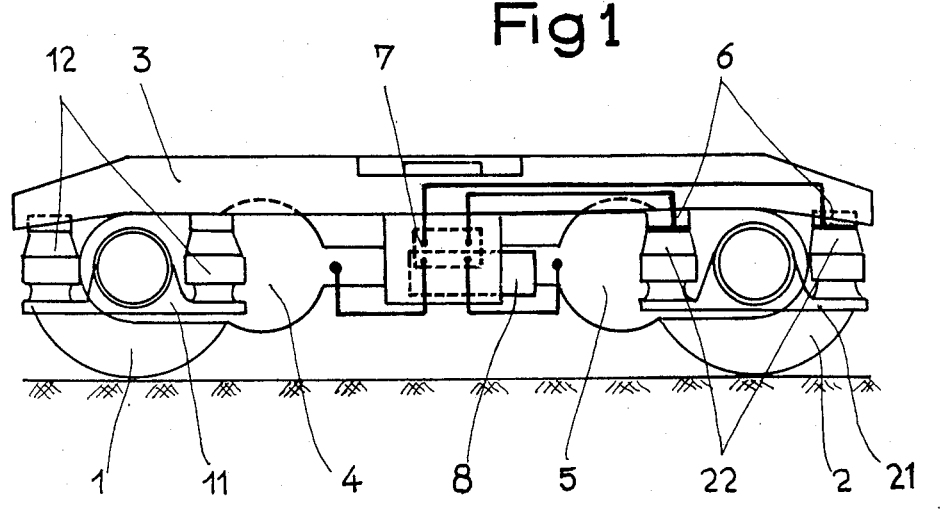
FIGS. 1 and 2 show a device according to the invention equipping a motor bogie seen in elevation in FIG. 1 and seen from below in FIG. 2.
Figure 2:
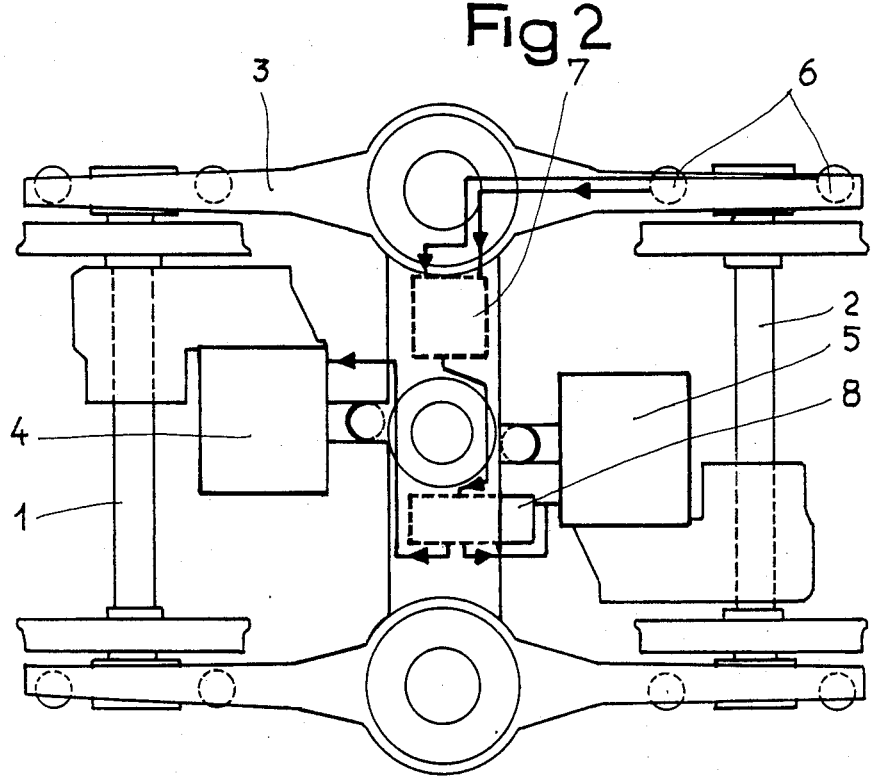
Figure 3:
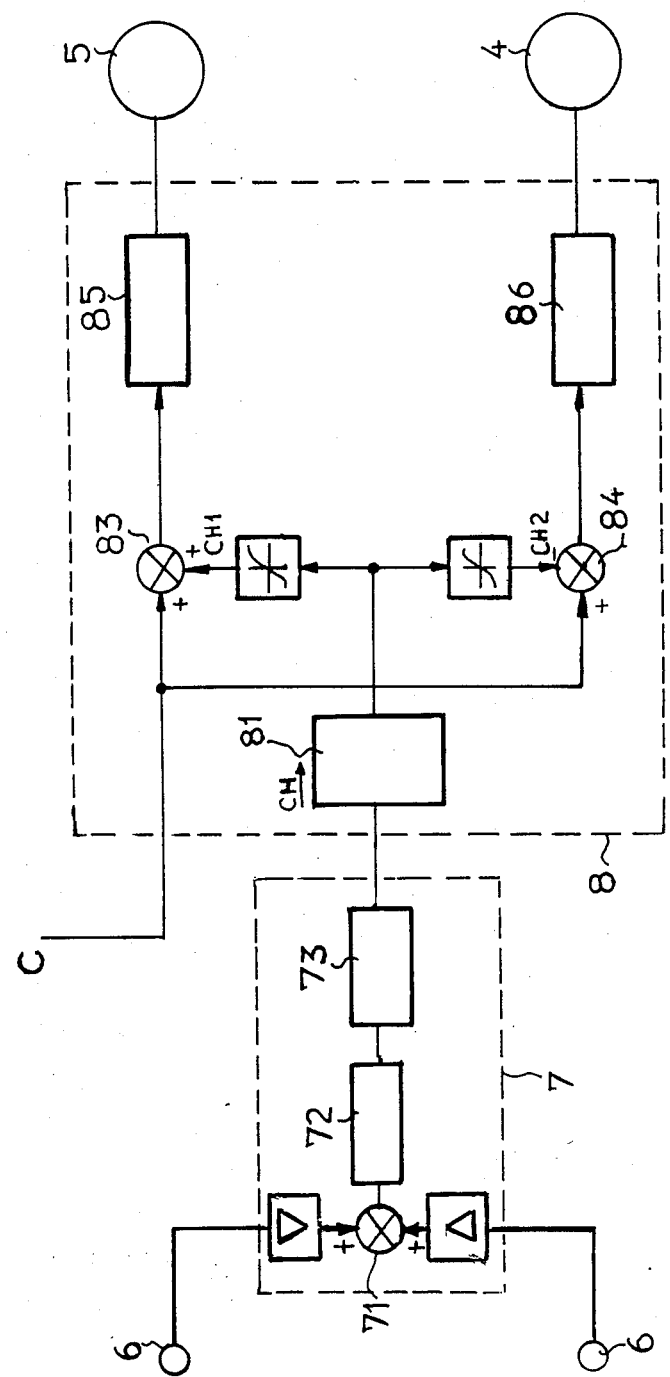
FIG. 3 is a diagram illustrating the electronic portion of the device.

The device equips a locomotive one of whose bogies is shown in the drawings, the other bogies being similar.

The bogie comprises two axles 1 and 2 whose axle boxes are numbered 11 and 21, respectively. The chassis of bogie 3 is suspended on the axle boxes 11 and 21 by elastic supports 12 and 22 which constitute the primary suspension. Each box supports the chassis 3 by two elastic supports (e.g., metallic springs) located on either side of the plane of symmetry passing through the axis of the axle. Each axle 1 and 2 is coupled to a motor 4 and 5, respectively, by the intermediary of a reduction gear.

The device comprises force sensors 6 which measure the instantaneous vertical load on an axle box such as 21, for example. A force sensor 6 is associated with each elastic support 22 of the primary suspension.

The force sensors 6 are located on the plates seated on the springs, preferably on the upper seated plates. If the elastic supports are metallic springs, the force sensors 6 can be placed on the surface of the wires constituting the springs.

The force sensors 6 are constituted by constraint gauges or by quartz sensors or the like.

The force sensors 6 transmit signals representative of the vertical load to an electronic signal processing circuit 7 which is composed of an amplifier, of a summator 71, of a means calculator 72 and of a filter 73. This circuit 7 receives the signals emanating from the sensors 6, amplifies them, summates them and gives them a means value, filtered. The exit signal CH of the circuit 7, which is representative of the load of the axle 2, is sent to an electronic circuit 8, which also receives a signal C of consignment of coupling or power. The circuit 8 operates at 81 a means for placing in a common scale the values of consignment and of measurement. The load image signal CH is added at 83 to the consignment C and escapes at 84 from the same consignment C. The signal coming from 83 is injected at the entrance to the couple controller 85 of the motor 5 whose axle carries the load sensors, and the signal coming from 84 is injected at the entrance of the couple controller 86 of the other motor 4.

Thus the circuit 8 controls the elements adjusting the power of electric motors 4 and 5, in such manner that the couple transmitted by one or the other of motors 4 and 5 increases when the load of the coupled axle increases, and decreases when the load of the coupled axle decreases.

In order to determine the load per axle, measurements could be made on the two axle boxes of a single axle.

The device described above applies to electric and diesel electric locomotives. It could be used on type CC locomotives.

What is claimed is:

1. A device for preventing nose lift of a locomotive bogie that has a pair of axles individually driven by respective electric motors, said device comprising sensor means mounted on a primary suspension of one of said axles for measuring a vertical load on said one axle and producing a corresponding signal, and means responsive to said signal produced by said sensor means for controlling said motors so as to vary the driving of one of said motors relative to the other motor in a manner that prevents nose lift of said bogie.

2. A device according to claim 1, wherein said sensor means comprises sensors mounted on plates seated above elastic supports of said primary suspension.

3. A device according to claim 2, wherein said sensor means comprises constraint gauges.

4. A device according to claim 2, wherein said sensor means comprises quartz sensors.

5. A device according to claim 2, wherein said means for controlling said motors comprises signal processing means for receiving signals produced by said sensor means and for producing therefrom an amplified and filtered mean value that is applied to a circuit which controls said motors.

* * * * *